May 12, 1953 R. C. BALLARD 2,638,587
PULSE ECHO ALTIMETER WITH MECHANICALLY DRIVEN INDICATOR
Filed Feb. 18, 1949 5 Sheets-Sheet 1

INVENTOR
Randall C. Ballard
BY J. L. Whittaker
ATTORNEY

May 12, 1953          R. C. BALLARD          2,638,587

PULSE ECHO ALTIMETER WITH MECHANICALLY DRIVEN INDICATOR

Filed Feb. 18, 1949                                        5 Sheets-Sheet 3

INVENTOR
Randall C. Ballard
BY
J. L. Whittaker
ATTORNEY

Patented May 12, 1953

2,638,587

UNITED STATES PATENT OFFICE 2,638,587

PULSE ECHO ALTIMETER WITH MECHANICALLY DRIVEN INDICATOR

Randall C. Ballard, Trenton, N. J., assignor to Radio Corporation of America, a corporation of Delaware Application February 18, 1949, Serial No. 77,178

10 Claims. (Cl. 343—13)

This invention relates to distance measuring systems and particularly to such systems in which the transit time of a modulated pulse of radio energy transmitted to and reflected from a remote object or surface is accurately measured and translated to a linear measurement on a direct reading indicator. One of the principal objects of this invention is to provide an improved pulse echo distance measuring system of simplified construction and capable of continuously indicating accurately determined distance from the system to the reflecting object or surface.

A further object is to provide an improved method and mechanism for obtaining distance readings on a visual indicator.

It is a further object of this invention to provide an improved circuit, controlled by the received pulse, which is capable of instantaneously analyzing the differential voltages and of applying the differential voltage to initiate necessary correction to the indicated distance and the associated voltage generator, the output of which is proportional to the indicated distance.

The present invention comprises a method and apparatus which is immediately and accurately responsive to variations in distance between the apparatus and a reflecting object or surface in which a voltage of one polarity and an amplitude which is a function of the propagation time of the modulated radio frequency pulse to and from the reflecting object is balanced against the amplitude and polarity of a voltage generated by a distance indicating device and the differential voltage utilized to energize a follow-up system which moves the indicator to a position in which an exact balancing voltage will be generated. The characteristics of the voltage generators are selected so that the voltage balance will be obtained when the actual distance to the reflecting object corresponds to the distance indicated.

A refined control is obtained by incorporating into the voltage balance system a third voltage which has a high rate of amplitude change and a high repetition rate with respect to the voltage that is a function of the propagation time of the pulse to and from the remote object. Means are provided for shifting the phase of the third voltage in a manner which causes the received pulse to be straddled by a high rate of change of amplitude and thereby materially increase the responsiveness of the system to relatively slight changes in distance.

The invention will be better understood from the following description made with reference to the accompanying drawings in which like reference characters refer to corresponding details throughout the drawings.

In the drawings:

Figure 5 is a graph referred to in the explanation of the manner of operation of the system in which the fine control has been incorporated;

Figure 1:
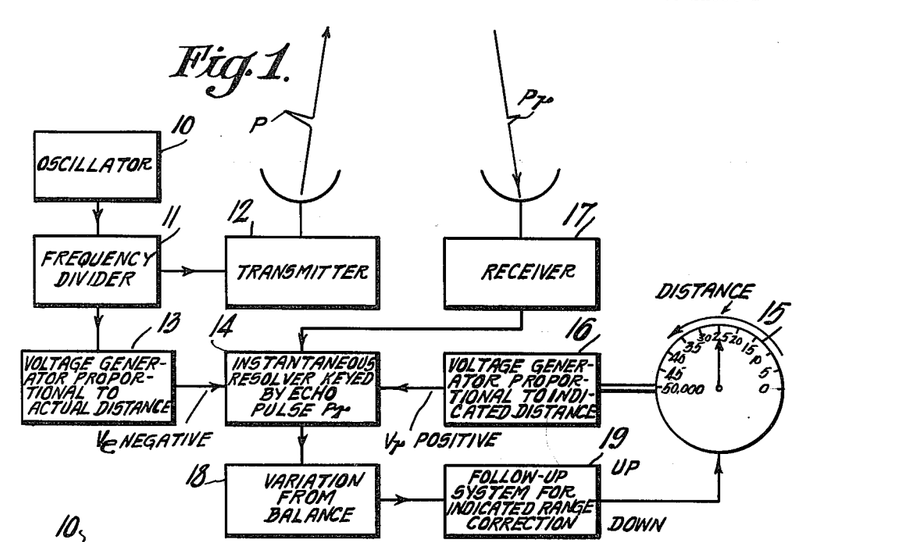
Figure 1 is a block diagram illustrating the association of the basic components of one embodiment of the invention.

The basic principles of operation of one embodiment of the system is illustrated in Figure 1 in which an oscillator 10, which may have an output of approximately 98,325 cycles, feeds a frequency divider 11 which is strongly sensitive to a division of about 1 to 20. The output of the frequency divider 11 keys the transmitter 12 which broadcasts a modulated pulse P in the direction of the reflecting object or surface. The frequency divider 11 simultaneously keys a saw-tooth generator 13 which produces a voltage the amplitude of which is essentially a periodic function of the propagation time of the transmitted and reflected pulse. The constants of the circuit 13 are selected so that the voltage is of one polarity. The voltage $V_e$ developed by the saw-tooth generator is applied to the voltage resolving circuit 14. There is also provided a visual reading distance indicator 15 which has associated with it a range potentiometer 16 which generates a voltage having a polarity opposite to that developed by the saw-tooth generator and an amplitude which is proportional to the indicated distance on the visual reading indicator 15. The voltage developed by the range potentiometer 16 is applied in opposition to the saw-tooth voltage in the resolver circuit 14. The reflected pulse $P_r$ is picked up by the receiver 17, amplified therein, and applied to the resolver circuit 14 in a manner which causes the resolver circuit to be instantaneously actuated and to develop a potential which in polarity and amplitude represents the variation from balance between the instantaneous or sampled values of the saw-tooth generator 10 and the potentiometer voltages applied in opposition. The differential voltage $V_r$ thus developed is accepted by circuit 18 and applied to the follow-up system 19 as $V_c$. The follow-up system 19 is operably connected to the visual reading distance indicator 15 and, depending on the polarity of the voltage $V_r$, will cause an up or down correction in the indicator distance. The change in indicator distance will cause a proportional change in the voltage output of the range potentiometer 16 which is associated with the visual reading indicator sufficient to cause the voltage output to balance the sampled saw-tooth generator voltage. The system will thus be in balance and the voltage $V_r$ will then be zero. The voltage generators 13 and 16 are initially calibrated so that the distance traveled by the pulse $P_r$ equals the indicated range when the voltages are thus balanced, and the system is thus obtaining the desired performance.

Figure 2:
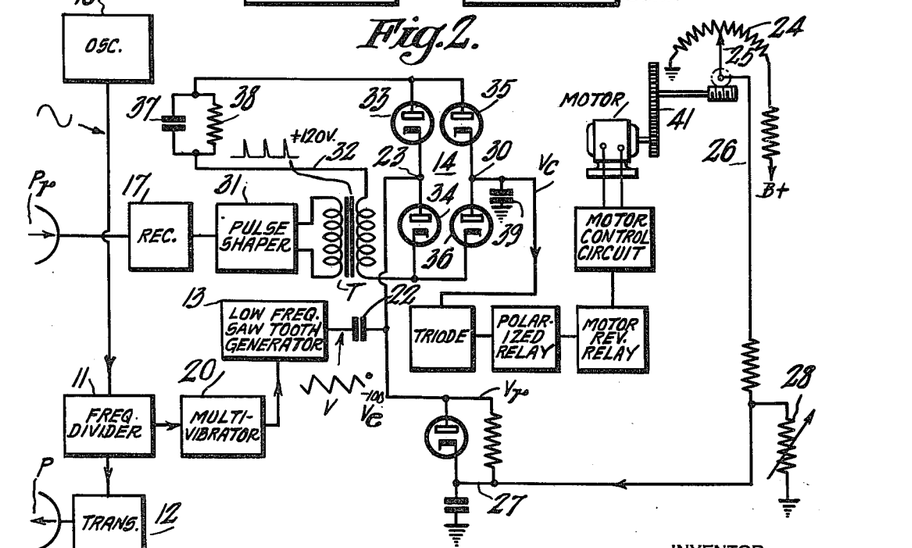
Figure 2 is a diagrammatic illustration of one embodiment of the invention showing the phase detector which resolves the voltage differential and applies the voltage differential to the follow-up system.

Figure 2 illustrates an embodiment of the invention in further detail and indicates critical characteristics which may be employed in utilizing the invention. The crystal oscillator 10 produces a sine wave having a repetition rate of about 98,325 kilocycles. This output is fed to a clipper which delivers a negative pulse to the cathode of a blocking oscillator divider 11 which has a tuned cathode circuit which is sensitive to a frequency division of about 1 to 20. A pulse output with a repetition rate of about 4,900 kilocycles is thus obtained. This output is applied simultaneously to the transmitter 12 and to the low frequency saw-tooth generator 13 which is driven by a multivibrator 20. The constants of the circuits are selected so that the saw-tooth voltage has a slope of about one volt per microsecond and is negative to ground. Since the propagation rate of the pulse is about 1000 feet per microsecond, in order to obtain an acceptable indicated range of 50,000 feet for the system, it is necessary to have the saw-tooth voltage develop a maximum amplitude of about 100 volts. It will be apparent that at the prescribed rate of increase of the low frequency saw-tooth voltage that the voltage at any instant is proportional to the distance traveled by the pulse P which was generated simultaneously with the beginning of a saw-tooth voltage cycle. The saw-tooth voltage thus developed is applied to the junction 23 of the voltage resolver 14, which is hereafter referred to as the "phase detector."

A potentiometer 24 develops a positive voltage which is proportional to the distance indicated by the visual reading indicator 15. The voltage developed is supplied by the potentiometer arm 25 to the lead 26 through the diode clamper 27, which applies the positive extreme of the wave form to the phase detector at the junction 23. A variable shunt 28 is placed in the line 26 so that the amplitude of the voltage delivered to the phase detector by the range potentiometer may be adjusted to match that of the voltage delivered by the low frequency saw-tooth generator. The characteristics of the range potentiometer are selected so that a change of 5,000 feet in indicated distance will cause a change in voltage amplitude delivered by the range potentiometer of 10 volts. Consequently, an increase in propagation time of 10 microseconds will permit the amplitude of the saw-tooth voltage, which rises at the rate of one volt per microsecond, to increase 10 volts, while a change in indicated distance of 5,000 feet, which would involve a pulse transit time of 10 microseconds, will cause a similar change of 10 volts in the amplitude of the voltage delivered by the range potentiometer. When the aforementioned generators are thus calibrated and the voltages developed by them are applied in opposition to the phase detector, the amplitude and polarity difference of the voltages will accurately represent the change in indicated distance reading which is necessary to bring the indicated distance into coincidence with the distance traveled by the pulse to the reflecting object or surface. The manner in which this differential voltage, hereinafter referred to as the "control voltage," is established and applied to the follow-up system is hereafter described in detail.

The control voltage, which is tapped from the phase detector at the junction 30, may be applied directly to a motor control relay to initiate the corrective movement of the distance indicator or, in the preferable form, as shown in the embodiment of the invention disclosed in the drawings, may be delivered to the motor control circuit consisting of a double triode, a polarized relay, and a motor reversing relay. In this modification the control voltage is applied to one of the grids of the double triode (the grid of the other triode being returned to a fixed bias) and the plate current output of the triode is utilized to control the motor relays. The relays may be arranged to go to a neutral or midway position, and thus cut out the motor, when the control voltage is zero. This relay action is obtained by properly biasing the triode and adjusting the relays. Preferably, however, the relays have no midway position but continually oscillate (when the system is balanced) causing the motor to reverse itself many times a second.

The reflected pulse $P_r$ is picked up by the receiver 17 and passed through the customary amplification stages and supplied to the grid of a pulse shaper 31. This pulse shaper may comprise a blocking oscillator which triggers at a point about half way up the leading edge of the received signal. This circuit functions to avoid inaccuracies which would be introduced as a result of the varying shape of the reflected pulse $P_r$. The plate circuit of the pulse shaper is inductively coupled by transformer T to the biasing circuit 32 of the phase detector 14.

The phase detector includes a pair of diodes 33 and 34 in series and a second pair of diodes 35 and 36 in series. Both pairs of diodes are connected in parallel in the biasing circuit 32. The biasing circuit also includes a capacitor 37 and a shunt resistor 38. The junction 23, between the diodes 33 and 34, is connected to the sources of the voltages $V_e$ and $V_r$ as previously described. The control voltage $V_c$ developed by the phase detector is tapped at the junction 30 between the diodes 35 and 36, as heretofore mentioned. The constants of the pulse shaper 31 are selected so that the voltage induced in the transformer T will have a maximum amplitude of about 120 volts and a polarity such that the diodes will be conductive. In the embodiments illustrated this may be accomplished by selecting the constants which will cause the pulse shaper to deliver pulses of approximately 120 volt peaks and a positive polarity. A positive voltage will thus be induced in the plate circuits of the diodes in series and the diodes will thus become conductive. The capacitor 37, however, will collect a biasing charge when current flows in the circuit and, as the voltage delivered by the transformer T recedes from its maximum value, the charge thus collected will be sufficient to bias the diodes beyond cutoff and the circuit thus becomes conductive only at the instant of peak voltage. This characteristic can be established by using a resistance of approximately 2 megohms for the resistance 38 and a capacitor of about .005 microfarad for the capacitor 37. When the described conditions are maintained the diodes are balanced to ground and no current will flow at the junctions 23 and 30. This is the condition which exists in the system when the voltage $V_e$, generated by the low frequency saw-tooth, and the voltage $V_r$, generated by the range potentiometer, are in balance. In this condition the control voltage $V_c$ will be zero and the system will remain in the balanced condition.

It will be seen, however, that if during the peaks of the pulses delivered by the pulse shaper 31, which in turn is responsive to the received pulses $P_r$ when the circuit is conductive, a positive voltage with respect to ground is applied to the junction 23 it will have the effect of lowering the effective bucking bias on the diode plate 34 and of raising the potential of the plate of diode 33. This will cause diode 33 to become conductive and continue to conduct until the plate of diode 34 is raised to the same potential, at which time the positive voltage applied to the junction 23 will be balanced. It will be noticed, however, that raising the potential of the plate 33 will cause the diode 35 to conduct and establish a potential at the junction 30 equal in amplitude and polarity to that applied to the junction 23.

It may be assumed, to aid the explanation, that the positive voltage applied to the junction 23 is 30 volts. As a result of the operation described a potential of +30 volts will be established at the junction 30. The capacitor 39 is connected to the junction 30 through low impedance so that the capacitor 39 will charge instantaneously to 30 volts. When the pulse delivered by the pulse shaper recedes slightly from its maximum amplitude and the circuit becomes non-conductive, the capacitor 39 will discharge slowly to the grid of the triode in the motor control circuit as a result of the relatively high impedance of the motor control circuit. Thus actuated, the motor will drive the potentiometer arm through gear wheels to a lower position on the range potentiometer and reduce the positive voltage generated by the range potentiometer to a point at which it is in balance with the negative voltage generated by the low frequency saw-tooth. The net voltage at the junction 23 will thereupon be zero and during subsequent periods of conductance no control voltage will be developed.

A similar operation results when the negative voltage developed by the low frequency saw-tooth exceeds that of the range potentiometer. In this instance, the control voltage $V_c$ will have a negative polarity and the motor control relay will be actuated in a direction opposite to that previously described and will cause the potentiometer arm to move toward a higher position. The balance is thus similarly restored.

In the event that the voltage applied at the junction point 23 should change in value during the period when the circuit is conductive, the change will be reflected immediately in the charge retained by the capacitor 39. A decreasing positive voltage will establish a potential between the junctions 23 and 30 which will cause the capacitor to discharge down to an equal voltage through the diodes 36 and 34. A decrease in the negative voltage applied at the junction 23 with respect to the charge of the capacitor 39 will cause the discharge to pass current through the diodes 35 and 33 until the potential difference has been equalized.

It thus appears that the phase detector provides a method and means of establishing the voltage differential which exists at the junction 23 during the instant when the received pulse $P_r$ causes the circuit to conduct. Accordingly, means are provided for measuring the transit time of the transmitted pulse, in terms of a voltage which is balanced against a second voltage, which is a function of the indicated distance of the system from the reflecting object or surface. The initial calibration of the comparison voltages is such that the voltage necessary to balance the first voltage, which is a function of the propagation time for distance traveled by the transmitted pulse, will offer a direct reading of the distance between the system and the reflecting object or surface.

Figure 3:
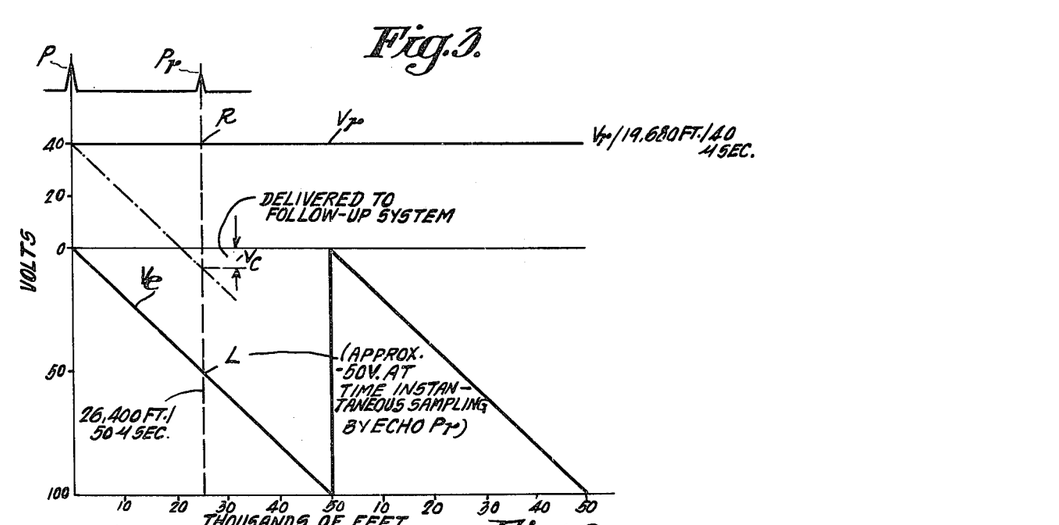
Figure 3 is a graph referred to in the explanation of the operation of the systems illustrated in Figures 1 and 2.

Figure 3 illustrates the values of the controlling factors which would exist under the conditions in which the actual distance from the reflecting object or surface to them was 26,400 feet and the indicated range was 19,680. At the specified setting the range potentiometer would develop a positive voltage of 40 volts as represented by the graph $V_r$. The transmissions of the pulse P would initiate the generation of saw-tooth voltage $V_e$ of negative polarity. This voltage would increase toward its maximum amplitude of 100 volts at the rate of about 1 volt per microsecond or approximately 10 volts per 5,000 feet of distance (i. e. 10,000 feet of actual distance traveled by the pulse). The echo of pulse $P_r$ would be received by the system 50 microseconds after transmission. This pulse would instantaneously actuate the phase detector and the voltage resolved at that instant would be equal to the voltage $V_c$ representing the differential in amplitude and polarity of the voltages $V_e$ at the point L and the voltage $V_r$ at the point R. This potential would thus be established at the junction 23 of the phase detector at the instant of sampling by the received pulse and, accordingly, available on the capacitor 39 for initiating corrective movement of the indicator 15 and the associated range potentiometer 24. The negative voltage developed would move the indicator to a higher value. The movement would continue until the voltage output of the range potentiometer would equal that of the saw-tooth voltage at the point L, at which time the indicator would read 26,400 feet, thus indicating the correct distance. At this point the value of $V_c$ would have become zero and the motor control would be inactivated.

The distance indicator may be controlled with fine accuracy by incorporating into the system a relatively high frequency saw-tooth voltage with respect to the low frequency saw-tooth voltage so that the low frequency saw-tooth wave will in effect be re-formed into a series of steps. The slope of the step towards negative polarity has a high rate of change of amplitude per unit of time or distance. A phase shifter is provided which retards the phase of the high frequency saw-tooth voltage to the extent necessary to continually position the negative slope on the phase detector at the time the actuating pulse is received. The degree of angularity which must be imparted to the phase shifter to accomplish the specified result is proportional to the change in indicated distance necessary to make the indicated distance equal to the actual distance traveled by the pulse to the reflecting object or surface. The exact manner of operation is hereafter developed in detail.

Figure 4:
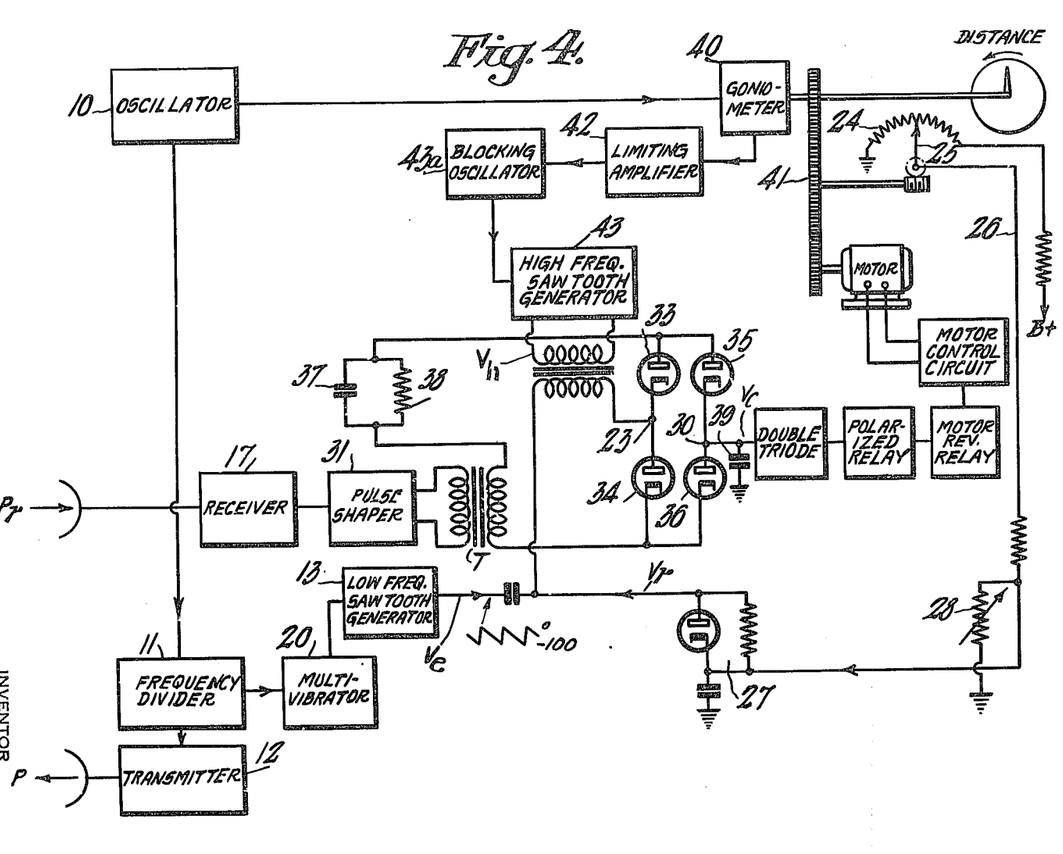
Figure 4 is a diagrammatic illustration of the system showing the refined control component incorporated therein.

In the embodiment illustrated in Figure 4, the fine accuracy is obtained by means of the crystal oscillator 10 which, in addition to feeding the frequency divider, as previously described, also feeds a phase shifter 40. The phase shifter may be of any suitable conventional design but preferably it is the type described in application Serial No. 677,450, filed June 18, 1946, in the name of Stuart W. Seely, and entitled Electrical Networks for Phase Shifters, now Patent No. 2,442,097, issued May 28, 1948. This goniometer type phase shifter drives off the gear train 41 connecting the motor to the potentiometer arm 25 of the range potentiometer. In the instant embodiment there is a one to ten reduction in the gear drive to goniometer. This gear ratio will result in one complete revolution of the goniometer to a change in indicated distance of 5,000 feet. The goniometer output produces a square wave in the limiting amplifier 42 which is utilized to trip a blocking oscillator 43a and saw-tooth generator 43. The constants of these last named circuits are selected so that the output of the high frequency saw-tooth generator is a wave which has a gradual linear slope in the direction of maximum positive amplitude of about 9.5 microseconds and a steep linear slope towards maximum negative amplitude of about .5 microsecond. The graph designated $V_h$ in Figure 5a illustrates a wave having the described characteristics. It will be apparent therefrom that the .5 microsecond slope towards negative polarity results in a change of voltage of about 10 volts from peak to peak in a time interval which corresponds to about 250 feet of travel by a pulse of radio energy. The high frequency saw-tooth wave is floating with respect to ground and may be superimposed upon the low frequency saw-tooth voltage $V_{e1}$ indicated in Figure 5a to produce the wave $V_{h1}$. This addition is made through the transformer coupling 44 to the junction 23 of the phase detector. It is to be understood that the voltage additions occurring at the junction 23 will be an algebraic addition and that any one of the voltages may be considered independently with respect to the remaining two, since the order of addition is immaterial to the proper functioning of the system. The phase of the high frequency saw-tooth voltage is set with respect to the dial indicator and the range potentiometer so that when these elements are at zero the steep slope of the saw-tooth voltage crosses its zero axis. This condition is illustrated at the point 45 of Figure 5a. Since the repetition rate of the high frequency saw-tooth with respect to the low frequency saw-tooth is 20:1 in the described embodiment and since the gearing ratio between the range potentiometer and the goniometer phase shifter is 10:1, the steep slope of the saw-tooth wave will cross its zero axis with respect to the low frequency saw-tooth at intervals of 5,000 feet. At distances intermediate the 5,000 foot intervals the angular setting of the goniometer phase shifter necessary to shift the zero axis of the steep slope to zero voltage at the time the phase detector is actuated by the received pulse will be a fine indication of the point of incidence of the received pulse in the 5,000 foot interval. Furthermore, if the value of the saw-tooth voltage is not zero at the time the received pulse actuates the phase detector, the deviation from coincidence will cause a relatively large control voltage to be established due to the high rate of change of amplitude on the steep slope and the voltage thus representing the deviation from coincidence may be used to shift the phase back to coincidence by means of the follow-up system and concomitantly make a fine adjustment of the indicated distance. The operation of the system in which the fine control has been incorporated may be better understood by an explanation of its operation when the system has been turned on at an altitude of 17,250 feet and the indicated range and the voltage generated by the range potentiometer are at zero. The transmission of the pulse P will trigger the low frequency saw-tooth generator and the voltage $V_e$ will develop towards negative polarity at the rate of about one volt per microsecond. The phase position of the goniometer has been set so that the steep slope of the high frequency saw-tooth voltage is passing its zero axis at the time the low frequency saw-tooth is triggered. The voltage successively applied to the junction 23 is thus represented by the wave form $V_{h1}$. The pulse $P_r$ will be received 35.1 microseconds after the transmission and will sample the voltage on the phase detector. The voltages applied to the junction 23 at that time will be the sum of —34.5 volts, due to the low frequency saw-tooth, and of approximately —.5 volt, due to the high frequency saw-tooth, which at that time is rising along its gradual slope near the zero axis. Since the indicated range is zero the voltage output of the range potentiometer is also zero and the total of the sample voltage is —35 volts. This would be resolved as the control voltage and applied to the grid of the motor control tube and cause the motor to rotate in the direction which will increase the indicated distance. Rotation of the motor in this direction will simultaneously rotate the goniometer and retard the phase of the high frequency saw-tooth voltage. The increase in indicated distance will, of course, cause the range potentiometer to develop a positive voltage. The calibration is such that these changes will offset one another and the negative potential resulting from a contribution of the low frequency saw-tooth to the circuit will remain unchanged for a period of time. The subsequent voltage relationships can be better understood by reference to Figure 5b, wherein the effect of the high frequency saw-tooth voltage is considered with respect to the range potentiometer output. The sampling by the received pulse occurred at the point 47. As the control voltage moved the indicated distance towards higher values the potentiometer voltage $V_r$ increased at the rate of 10 volts per 5,000 feet. It will be seen from Figure 5a that the rotation of the goniometer has retarded the phase of the high frequency saw-tooth so that the voltage change towards negative polarity is at about the same rate. This condition persists until the point 48 is reached, at which time the voltage contributed by the high frequency saw-tooth will rise 10 volts to the point 49 as the voltage moves up the .5 microsecond slope of the wave. This period will correspond to about a 250 foot change in indicated distance.

Figure 6:
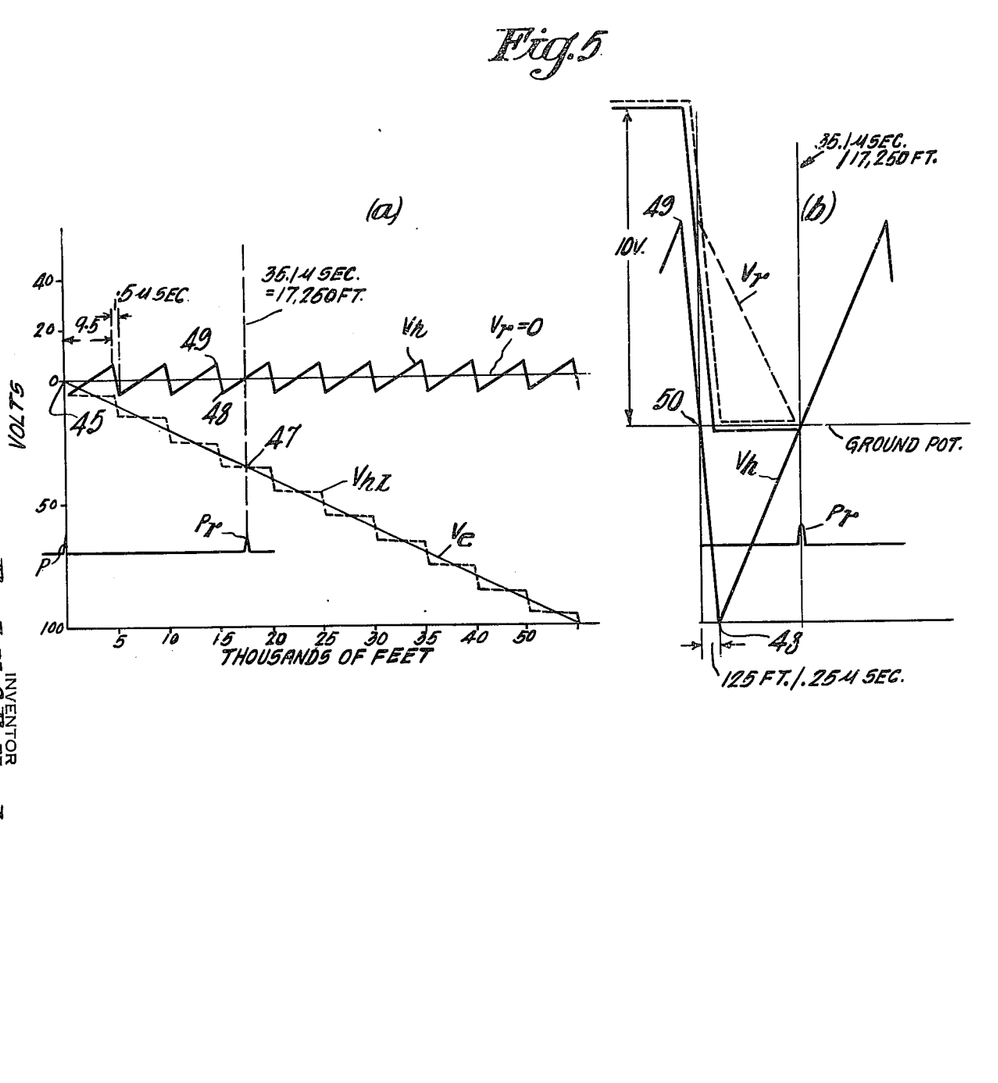
Figure 6 is a graph illustrating the outputs of the various voltage generators when the system is in balance under the specified conditions.

It will be seen, therefore, that the sudden change in a positive direction of about 10 volts to a voltage of —24 volts will occur in the total voltage impressed at the junction 23 of the phase detector. The total voltage will then remain at —24 volts until the indicated distance has increased another 5,000 feet and the goniometer has again rotated through 360 electrical degrees. The voltage $V_c$ will thus remain negative and will be decreased in steps until a distance of 17,250 feet is indicated, at which time the range potentiometer voltage will balance that contributed by the saw-tooth voltages. During the last 125 feet the control voltage will change from —5 volts to zero, which corresponds to the change indicated in Figure 5b between the points 48 and 50. At this time the wave shapes of the voltages applied to the system are represented in Figure 6. It will be seen that the combined voltage of the range potentiometer, the low frequency saw-tooth and the high frequency saw-tooth results in a stepped saw-tooth voltage wave that starts at +34.5 volts simultaneously with the transmission of the pulse and passes through zero 35.1 microseconds later. If a pulse reflected from an object 17,250 feet distant, thus having a transit time of 35.1 microseconds, would actuate the phase detector at this instant the various voltages applied to the junction 23 would be balanced and zero control voltage would result. The system will thus be balanced.

If the received pulse which triggers the phase detector were received earlier, as a result of the system moving towards the reflecting object, the phase detector will establish a positive control voltage since the negative voltage contributed by the low frequency saw-tooth will be decreased. If, for example, the signal were received .25 microsecond earlier, the wave form of the voltage $V_{h1}$ would have developed to the point 51 shown in Figure 6. In this instance the positive control voltage established by the phase detector would be that indicated at 52. This voltage would actuate the follow-up system and move the indicated distance to a lower reading, in the instant example the reading would be lessened by 125 feet. The adjustment of the indicated distance would also retard the phase of the high frequency saw-tooth voltage to the extent that its steep slope would cross its zero axis .25 microsecond later and the system would thus be again balanced. As the distance to the reflecting object or surface increases or decreases the high frequency saw-tooth continues to follow the pulse in the manner described, always straddling it with the same steep slope. Accordingly, a fine adjustment of the indicated distance is continually maintained.

Figure 7:
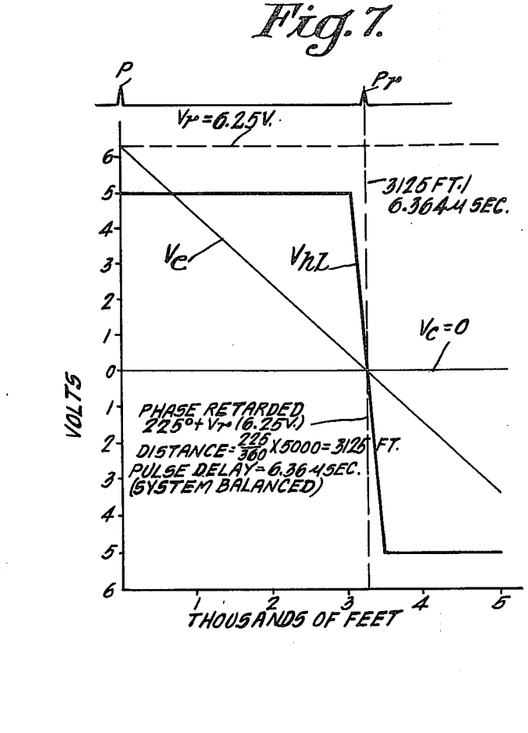
Figure 7 is a graph referred to in the explanation of the operation of the system as the distance to the remote object or surface is decreased.

Figure 7 represents the wave forms which contribute to the condition of balance as the system passes 3,125 feet. At the instant the pulse $P_r$ triggers the phase detector the range potentiometer voltage of +6.25 volts exactly balances the instantaneous value of the low frequency saw-tooth. The high frequency saw-tooth is passing through its zero axis at this instant and the voltage applied to the junction 23 of the phase detector is at zero and, consequently, no control voltage will be developed.

Figure 8:
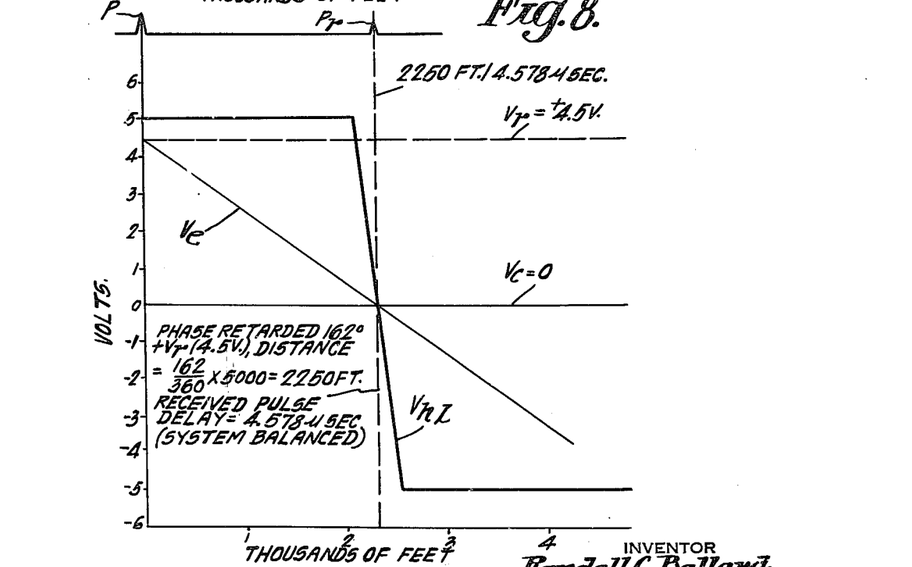
Figure 8 is an illustration of the conditions existing as the distance to the reflecting object is further decreased.

Figure 8 represents the conditions existing as the system passes 2,250 feet. The high frequency saw-tooth has continued to straddle the pulse and is passing through its zero axis at the time the received pulse samples the voltage applied to the junction 23 of the phase detector. The negative voltage developed by the low frequency saw-tooth exactly balances the positive voltage developed by the range potentiometer and the system is again balanced.

It will be understood that the various frequencies and characteristics of the wave forms, as well as the gear ratios employed between the mechanical elements of the system, may be varied and changed without departing from the scope of the invention, and that the embodiments of the invention specifically described for the purpose of facilitating a clear understanding of the invention are not to be construed as limitations thereof.

What is claimed is:

1. A pulse-echo distance measuring system comprising: means for transmitting a pulse of radio energy to a reflecting object; means for receiving said pulse after reflection; means for generating a first voltage having one polarity and an amplitude that is a periodic function of the distance traveled by said pulse; means for visually indicating the distance between said transmitting means and said object; means for generating a second voltage having a polarity opposite to that of the said first voltage and an amplitude that is a function of the indicated distance; means for resolving the polarities and the amplitudes of the said first and said second voltages into a differential voltage; means responsive to said pulse-receiving means for instantaneously sampling said differential voltage; a follow-up system connected to said distance indicating means and controlled by said sampled differential voltage, whereby the said follow-up system moves said distance indicating means to such a position that the said differential voltage is zero and the said indicating means indicates the true distance of said transmitter to said object.

2. A pulse-echo distance measuring system comprising: means for transmitting a pulse of radio energy to a reflecting object; means for receiving said pulse after reflection; means for generating a first voltage having one polarity and an amplitude that is a periodic function of the distance traveled by said pulse; means for visually indicating the distance between said transmitting means and said object; means for generating a second voltage having a polarity opposite to that of the said first voltage and an amplitude that is a function of the indicated distance; means normally inactive for resolving the polarities and amplitudes of the said first and said second voltages into a differential voltage; means responsive to said pulse receiving means for activating said resolving means, whereby said differential voltage is instantaneously sampled; a follow-up system connected to said distance indicating means and controlled by said sampled differential voltage, whereby the said follow-up system moves said distance indicating means to such a position that the said differential voltage is zero and the said indicating means indicates the true distance of said transmitter to said object.

3. A pulse-echo distance measuring system comprising: means for transmitting a pulse of radio energy to a reflecting object; means for receiving said pulse after reflection; means for generating a first voltage having one polarity and an amplitude that is a periodic function of the distance traveled by said pulse; means for visually indicating the distance between said transmitting means and said object; means for generating a second voltage having a polarity opposite to that of the said first voltage and an amplitude that is a function of the indicated distance; means for resolving the polarities and amplitudes of said first and said second voltages into a differential voltage, the said resolving means including a biasing circuit, a first pair of diodes in series with each other, a second pair of diodes in series with each other, both of said pairs being connected in parallel with said biasing circuit; means for applying said first and said second voltages to the junction between the diodes of the said first pair of diodes; means controlled by the said pulse receiving means for actuating said resolving means, whereby a sampled differential voltage is produced; a follow-up system connected to said distance indicating means and controlled by said sampled differential voltage, whereby the said follow-up system moves said distance indicating means to such a position that the said differential voltage is zero and the said indicating means indicates the true distance of said transmitter to said object.

4. A pulse-echo distance measuring system comprising: means for transmitting a pulse of radio energy to a reflecting object; means for receiving said pulse after reflection; means for generating simultaneously with said transmitted pulse a first saw-tooth voltage of one polarity and of an amplitude that is a periodic function of the distance traveled by said pulse; means for indicating the distance between said transmitting means and said object; means for generating a second voltage having a polarity opposite to that of the said first voltage and an amplitude that is a function of the indicated distance; a phase detector for resolving polarities and amplitudes of said voltages; means for applying the said first and said second voltages to said phase detector, whereby a differential voltage of said voltages is produced; means controlled by the said pulse receiving means for actuating said phase detector, whereby the said differential voltage is sampled only at the instant that the reflected pulse is received by said receiving means; a follow-up system connected to said distance indicating means and controlled by said sampled differential voltage, whereby the said follow-up system moves said distance indicating means to such a position that the said differential voltage is zero and the said indicating means indicates the true distance of said transmitter to said object.

5. A pulse-echo distance measuring system comprising: means for transmitting a pulse of radio energy to a reflecting object; means for receiving said pulse after reflection; means for generating simultaneously with said transmitted pulse a first saw-tooth voltage of one polarity and of an amplitude that is a periodic function of the distance traveled by said pulse; a distance indicator and a potentiometer operably connected thereto the generated output voltage of which is of opposite polarity to the said first voltage and the amplitude of which is a function of the indicated distance, both of said voltages being calibrated to oppose and balance each other when the indicated distance coincides with one half the distance traveled by said transmitted pulses to said object and back to said receiving means; means for resolving the polarities and the amplitudes of the said first and said second voltages into a differential voltage; means responsive to said pulse receiving means for instantaneously sampling said differential voltage; a follow-up system connected to said distance indicating means and controlled by said sampled differential voltage, whereby the said follow-up system moves said distance indicating means to such a position that the said differential voltage is zero and the said indicating means indicates the true distance of said transmitter to said object.

6. A pulse-echo distance measuring system comprising: means for transmitting a pulse of radio energy to a reflecting object; means for receiving said pulse after reflection; means for generating a first voltage having one polarity and an amplitude that is a periodic function of the distance traveled by said pulse; means for visually indicating the distance between said transmitting means and said object; means for generating a second voltage having a polarity opposite to that of the said first voltage and an amplitude that is a function of the indicated distance; means for resolving the polarities and the amplitudes of the said first and said second voltages into a differential voltage; a pulse-shaping circuit the input of which is connected to said receiving means and the output of which is connected to said resolving means, whereby the said resolving means is actuated only at the instant the reflected pulse is received by the said receiving means; a follow-up system connected to said distance indicating means and controlled by said sampled differential voltage, whereby the said follow-up system moves said distance indicating means to such a position that the said differential voltage is zero and the said indicating means indicates the true distance of said transmitter to said object.

7. A pulse-echo distance measuring system comprising: means for transmitting a pulse of radio energy to a reflecting object; means for receiving said pulse after reflection; means for generating simultaneously with said transmitted pulse a first saw-tooth voltage of one polarity and of an amplitude that is a periodic function of the distance traveled by said pulse; a distance indicator and a potentiometer operably connected thereto the generated output voltage of which is of opposite polarity to the said first voltage and the amplitude of which is a function of the indicated distance, both of said voltages being calibrated to oppose and balance each other when the indicated distance coincides with one half the distance traveled by said transmitted pulse to said object and back to said receiving means; means for resolving the polarities and amplitudes of said first and said second voltages into a differential voltage, the said resolving means including a biasing circuit, a first pair of diodes in series with each other, a second pair of diodes in series with each other, both of said pairs being connected in parallel with said biasing circuit; means for applying said first and said potentiometer voltages to the junction between the diodes of the said first pair of diodes; means controlled by the said pulse receiving means for actuating said resolving means, whereby a sampled differential voltage is produced; a capacitor one side of which is grounded and the other side of which is connected to the junction between the diodes of the said second pair of diodes; a motor control circuit connected to the said one side of said capacitor, a reversible motor connected to said control circuit, whereby said potentiometer is driven to a position such that the said differential voltage becomes zero and the said indicating means indicates the true distance of said transmitter to said object.

8. A pulse-echo distance measuring system comprising: means for transmitting a pulse of radio energy to a reflecting object; means for receiving said pulse after reflection; means for generating simultaneously with said transmitted pulse a first saw-tooth voltage of one polarity and of an amplitude that is a periodic function of the distance traveled by said pulse; means for indicating the distance between said transmitting means and said object; means for generating a second voltage having a polarity opposite to that of the said first voltage and an amplitude that is a function of the indicated distance; means for generating a third alternating voltage having a high repetition rate with respect to said first voltage and a high rate of change of amplitude in the direction of the polarity of the first named voltage; means for shifting the phase of the third voltage through more than 360 electrical degrees; a voltage comparator for resolving the polarities and amplitudes of voltages applied thereto, whereby a differential voltage is produced; means for applying said first and second and third voltages to said comparator; means controlled by the said pulse receiving means for actuating said comparator, whereby the said differential voltage is sampled only at the instant that the reflected pulse is received by said receiving means; a follow-up system connected to said distance indicating means and controlled by said sampled differential voltage, whereby the said follow-up system moves said distance indicating means to such a position that the said differential voltage is zero and the said indicating means indicates the true distance of said transmitter to said object.

9. A pulse-echo altimeter comprising means for transmitting a pulse of radio energy to a reflecting surface, means for receiving said pulse after reflection from the surface, means arranged to be triggered simultaneously with the transmitter for generating a saw-tooth voltage having one polarity and an amplitude that is a periodic function of the distance traveled by the transmitted pulse, means for generating an alternating voltage having a high repetition rate with respect to the first named voltage and a high rate of change of amplitude in the direction of the polarity of the first named voltage, means for shifting the phase of the alternating voltage through more than 360 electrical degrees, means for visually indicating the distance from the altimeter to the surface, means connected to said distance indicating means for generating a voltage having a polarity opposite to that of the first named voltages and an amplitude that is a function of the indicated distance, means for synchronizing the movement of said phase shifting means and the said distance indicating means, a voltage comparator for resolving the polarity and amplitude of voltages applied thereto, means for applying said generated voltages to said comparator, means controlled by the received pulse for instantaneously actuating the said comparator and sampling the resolved voltage, a follow-up system operably connected to said distance indicator and said phase shifting means, and means connected to said comparator and said follow-up system for accepting the resolved voltage from said comparator and applying the said resolved voltage to said system to move said distance indicator to a reading corresponding to the distance to said surface and said distance indicator voltage generator to a balancing position with respect to the other of said voltage generators.

10. A pulse-echo altimeter comprising means for transmitting a pulse of radio energy to a reflecting surface, means for receiving said pulse after reflection from the object or surface, means arranged to be triggered simultaneously with the transmitter for generating a saw-tooth voltage having one polarity and an amplitude which is a periodic function of the distance traveled by the transmitted pulse, means for generating an alternating voltage having a high repetition rate with respect to the first named voltage and a high rate of change of amplitude in the direction of the polarity of the first named voltage, means for shifting the phase of the alternating voltage through more than 360 electrical degrees, means for visually indicating the distance from the altimeter to the surface, means connected to said distance indicating means for generating a voltage having a polarity opposite to that of the first named voltages and an amplitude which is a function of the indicated distance, means for synchronizing the movement of said phase shifting means and the said distance indicating means, a phase detector for resolving the polarity and amplitude of voltages applied thereto comprising a biasing circuit, a first pair of diodes in series, a second pair of diodes in series, both of said pairs connected in parallel in said circuit, means for applying the said voltages to said phase detector at the junction of the diodes of one said pair, means controlled by the received pulse for instantaneously actuating the said comparator and sampling the resolved voltage, a follow-up system operably connected to said distance indicator and said phase shifting means, and means connected to said comparator and said follow-up system for accepting the resolved voltage from said comparator and applying the said resolved voltage to said system to move said distance indicator to a reading corresponding to the distance to said object or surface and said distance indicator voltage generator to a balancing position with respect to the other of said voltage generators.

RANDALL C. BALLARD.

References Cited in the file of this patent

UNITED STATES PATENTS

| Number | Name | Date |
| --- | --- | --- |
| 2,420,264 | Rost et al. | May 6, 1947 |
| 2,422,074 | Bond | June 10, 1947 |
| 2,427,366 | Mozley | Sept. 16, 1947 |
| 2,459,117 | Oliver | Jan. 11, 1949 |